(12) United States Patent
Reuhkala et al.

(10) Patent No.: US 9,338,637 B2
(45) Date of Patent: May 10, 2016

(54) PROVIDING ROUTING INFORMATION IN A COMMUNICATION SYSTEM

(75) Inventors: Erkki Reuhkala, Espoo (FI); Markku Rautiola, Tampere (FI); Jukka Kulha, Helsinki (FI); Jukka Nikander, Nummela (FI); Péter Pál Boda, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 293 days.

(21) Appl. No.: 10/534,083

(22) PCT Filed: Nov. 4, 2003

(86) PCT No.: PCT/FI03/00816
§ 371 (c)(1),
(2), (4) Date: May 5, 2005

(87) PCT Pub. No.: WO2004/043105
PCT Pub. Date: May 21, 2004

(65) Prior Publication Data
US 2006/0121904 A1    Jun. 8, 2006

(30) Foreign Application Priority Data
Nov. 6, 2002  (GB) .................................. 0225888.7

(51) Int. Cl.
*H04W 8/06* (2009.01)
*H04W 76/02* (2009.01)
(Continued)

(52) U.S. Cl.
CPC .............. *H04W 8/06* (2013.01); *H04W 76/022* (2013.01); *H04W 84/16* (2013.01); *H04W 92/02* (2013.01); *H04W 92/06* (2013.01)

(58) Field of Classification Search
CPC ..... H04W 8/06; H04W 84/13; H04W 76/022; H04W 92/06; H04W 92/02; H04W 84/16
USPC ........... 455/418–420, 432.1–432.3, 436–440, 455/445, 558, 550.1, 551, 552.1
See application file for complete search history.

(56) References Cited

U.S. PATENT DOCUMENTS 5,400,390 A    3/1995  Salin ............................... 379/59
5,425,085 A    6/1995  Weinberger et al.
(Continued)

FOREIGN PATENT DOCUMENTS

JP    8-163639 A    6/1996
JP    2000-23211 A    1/2000
(Continued)

OTHER PUBLICATIONS

Canadian Office Action, Jul. 10, 2009 (3 pages).
(Continued)

*Primary Examiner* — Marcos Torres
(74) *Attorney, Agent, or Firm* — Ditthavong & Steiner, P.C.

(57) ABSTRACT

A method for providing routing information for establishing connections over a communication system comprising a plurality of communication networks is described. The method comprises storing location dependent routing information in a data storage, providing a terminal with location dependent routing information stored in the data storage and establishing connection between the terminal and at least one other terminal using location dependent routing information provided by the data storage. At least one of the terminals is a mobile terminal and information for routing the connection between the terminals is selected based on the location of the at least one mobile terminal.

15 Claims, 8 Drawing Sheets

(51) Int. Cl.
*H04W 84/16* (2009.01)
*H04W 92/02* (2009.01)
*H04W 92/06* (2009.01)

(56) References Cited

U.S. PATENT DOCUMENTS

| | | | |
|---|---|---|---|
| 5,519,769 A | 5/1996 | Weinberger et al. | |
| 6,085,085 A * | 7/2000 | Blakeney et al. | 455/426.1 |
| 6,175,622 B1 | 1/2001 | Chiniwala et al. | 379/211 |
| 6,324,404 B1 | 11/2001 | Dennison et al. | 455/456 |
| 6,424,832 B1 * | 7/2002 | Britt | H04Q 3/005 455/432.1 |
| 6,819,921 B2 * | 11/2004 | Mazzarella et al. | 455/419 |
| 6,831,902 B1 * | 12/2004 | Dougherty et al. | 370/328 |
| 6,847,822 B1 * | 1/2005 | Dennison et al. | 455/456.1 |
| 7,133,678 B1 * | 11/2006 | Berkowitz | H04W 8/12 379/201.02 |
| 7,162,237 B1 * | 1/2007 | Silver et al. | 455/432.3 |
| 7,295,844 B1 * | 11/2007 | Moon et al. | 455/445 |
| 2002/0082044 A1 * | 6/2002 | Davenport | H04B 1/0003 455/552.1 |
| 2002/0107011 A1 | 8/2002 | Mazzarella et al. | |

FOREIGN PATENT DOCUMENTS

| | | |
|---|---|---|
| JP | 2002-57621 A | 2/2002 |
| JP | 2002-291045 A | 10/2002 |
| WO | WO 92/13428 | 8/1992 |
| WO | WO 99/56326 | 11/1999 |
| WO | WO 01/43395 A1 | 6/2001 |
| WO | WO 02/21768 A2 | 3/2002 |
| WO | WO 02/25985 A1 | 3/2002 |

OTHER PUBLICATIONS

Chinese office action for corresponding CN application No. 200380102887.5 dated Feb. 9, 2010, pp. 1-17.

Chinese office action for corresponding CN application No. 200380102887.5 dated Mar. 27, 2009, pp. 1-15.

Chinese office action for corresponding CN application No. 200380102887.5 dated Sep. 7, 2007, pp. 1-20.

Taiwanese office action for corresponding TW application No. 092131133 dated Sep. 24, 2010, pp. 1-5.

Japanese Office action for corresponding JP application No. 2008-099698 dated Jul. 26, 2011, pp. 1-4.

Japanese Office action for corresponding JP application No. 2008-099698 dated Jan. 11, 2011, pp. 1-8.

Office Action for corresponding Chinese Application No. 200380102887.5 dated Aug. 5, 2013, 6 pages. (English Language Summary Included).

Chinese Office Action corresponding to Application No. 200380102887.5, issued on Apr. 3, 2013.

* cited by examiner

PROVIDING ROUTING INFORMATION IN A COMMUNICATION SYSTEM

CROSS REFERENCE TO RELATED APPLICATION

This application is the U.S. National Stage of International Application Number PCT/FI2003/000816 filed Nov. 4, 2003 and published May 21, 2004 in English under International Publication Number WO 2004/043105 A1.

FIELD OF INVENTION

The present invention relates to the field of mobile telecommunications, and, more specifically, to providing routing information for establishing connections involving at least one mobile station over a communication system.

BACKGROUND TO INVENTION

Mobile telecommunications systems providing mobility for the users of mobile user equipment (UE) referenced to as mobile stations (MS) are known. A typical example of a mobile station is the mobile telephone. However, other types of mobile stations than mobile telephones are also known, these including devices such as mobile personal data assistants (PDA) or portable or otherwise mobile computers (e.g. laptop PCs) provided with means for wireless communication.

A feature of the mobile telecommunications systems is that these systems enable the users thereof to make and receive calls and otherwise use their mobile stations also in visited networks in addition to enabling mobility in the home network of the mobile subscriber.

Use of the resources of a network other than the home network is referred to as roaming. The roamed network will be referred to in the following as a visited network. The visited network is typically a network run by another operator. The network can be operated either abroad or in the same country as where the home network operates.

A typical example of roaming is when a subscriber to a network operated in a first country uses his/her mobile station via a network operated in another country when visiting said other country. This type of roaming is known as international roaming. However, as mentioned above, the user may also roam into a network operated in the home country of the user.

The costs of roaming, and especially international roaming to mobile users can be relatively high compared to home network mobile communications or Public Switched Telephone Network (PSTN) communications via, for example, fixed telephone lines from a foreign country. A reason for this is that the mobile subscriber may be subjected to costs such as international call charges, specific roaming charges and other costs not appearing in the connections in the home network. The cost factor may be especially relevant for organizations such as big corporations, international communities and similar bodies responsible for paying the phone bills of a substantial number of travellers.

Roaming costs are present in the current billing mechanism for mobile users. Although it could be possible to rely more on fixed line connections when travelling this would mean that the advantage of mobility is lost.

A number of mobile telecommunications operators offer special International Direct Dial (IDD) services for pre-paid users. Whilst an IDD service may be used for reducing the costs of outgoing calls abroad such solutions are not particularly user-friendly. The user-unfriendliness may be increased by the fact that they typically operate on an Interactive Voice Response (IVR) platform. The users may find it frustrating to dial in to an IVR platform, authenticate themselves with a Personal Identification Number (PIN) code or similar means and then eventually key in the number they want to reach. Moreover, this approach does not provide a solution for receiving calls whilst abroad without becoming liable for the roaming costs. In this latter case, the international roaming costs are payable, since the home number of the roaming user is seen as a foreign number from the actual country the roaming user is in.

Furthermore, users, in particular mobile users, are often accustomed to name-based dialling using for example private phonebooks stored in the user's telephone. Typically, only the most often used telephone numbers of individual persons are stored in such a private phonebook. Alternative numbers, such as numbers exploiting a company's private network or universal access numbers, are seldom stored in the private phonebooks and, consequently, are seldom used. This issue is present while roaming, but also when the terminal is in the home network.

SUMMARY OF INVENTION

Embodiments of the present invention aim to address one or several of the above problems. Certain embodiments aim to enable mobile users to use alternative numbers easily. For example, when roaming or calling abroad from the home network the embodiments may allow calls at a lower cost than in the prior art. In certain other embodiments a call can be made to a roaming mobile station using one of alternative ways to route the call to the mobile user. This may be used to reduce the costs for both the calling user and the called roaming mobile user.

According to one aspect of the present invention, there is provided a method for providing routing information for establishing connections over a communication system comprising a plurality of communication networks, the method comprising storing location dependent routing information in a data storage, providing a terminal with location dependent routing information stored in the data storage and establishing a connection between the terminal and at least one other terminal using location dependent routing information provided by the data storage, wherein at least one of the terminals is a mobile terminal and information for routing the connection between the terminals is selected based on the location of the at least one mobile terminal.

According to another aspect of the present invention there is provided an arrangement in a communication system comprising a plurality of communication networks for providing a terminal with information for establishing a connection to at least one other terminal, the arrangement comprising a data storage for storing location dependent routing information, means for transferring location dependent information from the data storage to the terminal and, in the terminal, means for establishing a connection between the terminal and at least one other terminal using location dependent routing information provided by the data storage, wherein at least one of the terminals is a mobile terminal and information for routing the connection between the terminals is selected based on the location of the at least one mobile terminal.

According to another aspect of the present invention there is provided a computer program, a mobile terminal and a routing server adapted to the embodiments.

The embodiments may provide a calling user with advantages of large telephone diaries and wide dialling options, which may be updated efficiently. The telephone diaries and dialling options the user is familiar with in the home network may be provided also in a visited network when roaming. The embodiments of the invention may provide means for cost-effective roaming for mobile users. Similar cost savings may be achieved also in the home network. For example, optimized and updated routing information may be used when establishing a connection abroad from the home network.

The operation may be made transparent for the user. An automatic updating of the routing information and an automatic call routing provided in accordance with certain embodiments may be used to ensure that the users will use the system, thus ensuring that benefits offered by the system are obtained. The automatic updating of the routing information and the automatic routing preferably occur without any explicit effort from the user. The embodiments of the invention may ensure that an optimization of call routing may be affected.

A SPECIFIC DESCRIPTION OF PREFERRED EMBODIMENTS

Figure 1:
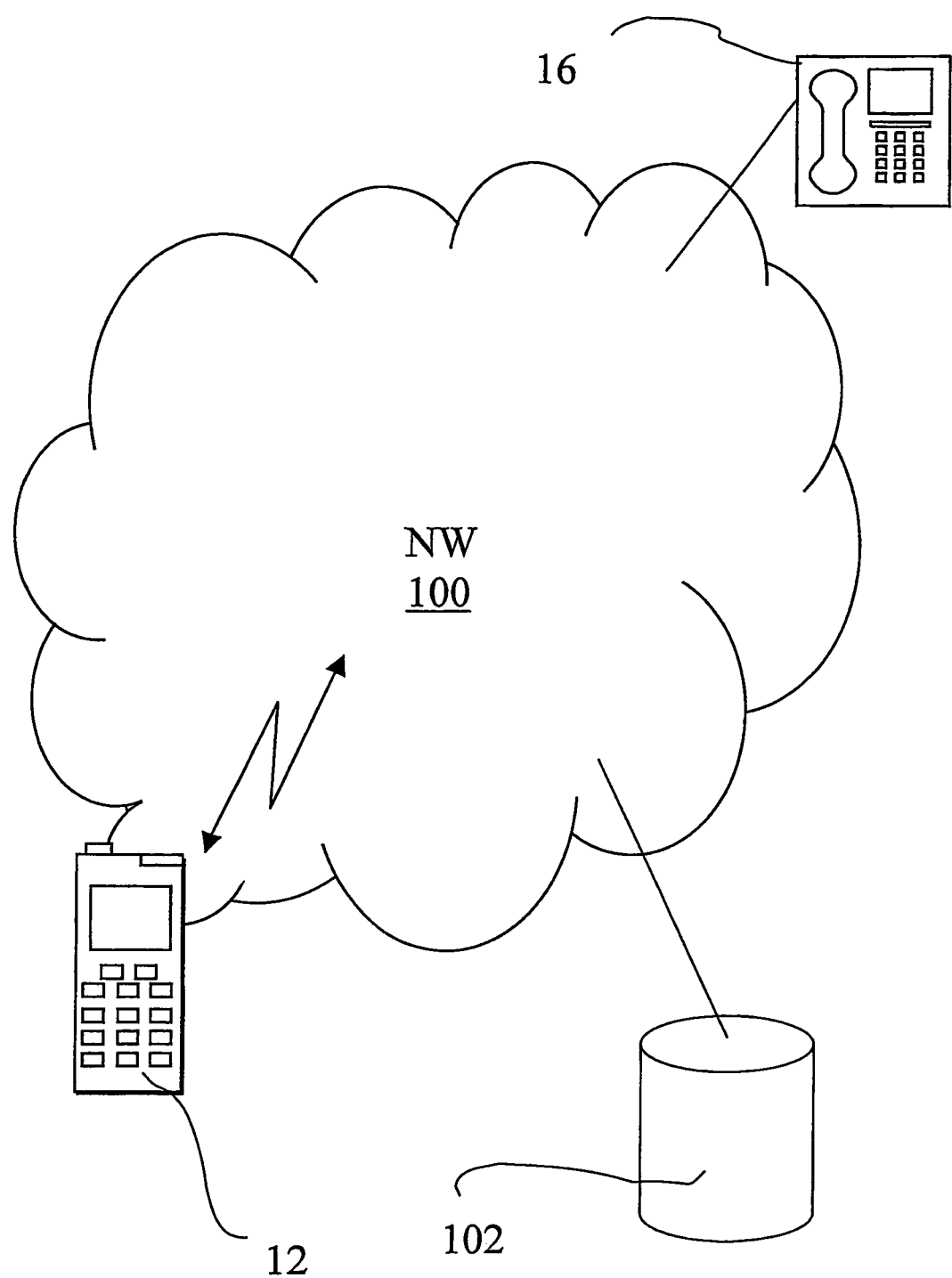
FIG. 1 is a schematic view of a system wherein the invention may be embodied.

FIG. 1 shows a schematic system for providing connection between a mobile terminal 12 and another terminal 16 in a communication system 100. The communication system 100 may comprise a network provided by an operator or more than one network provided by more than one operator. A data storage 102 is also provided for storing location dependent information. The data storage 102 may be connected to the communication system 100 in various ways, as will be explained in the following.

Figure 2:
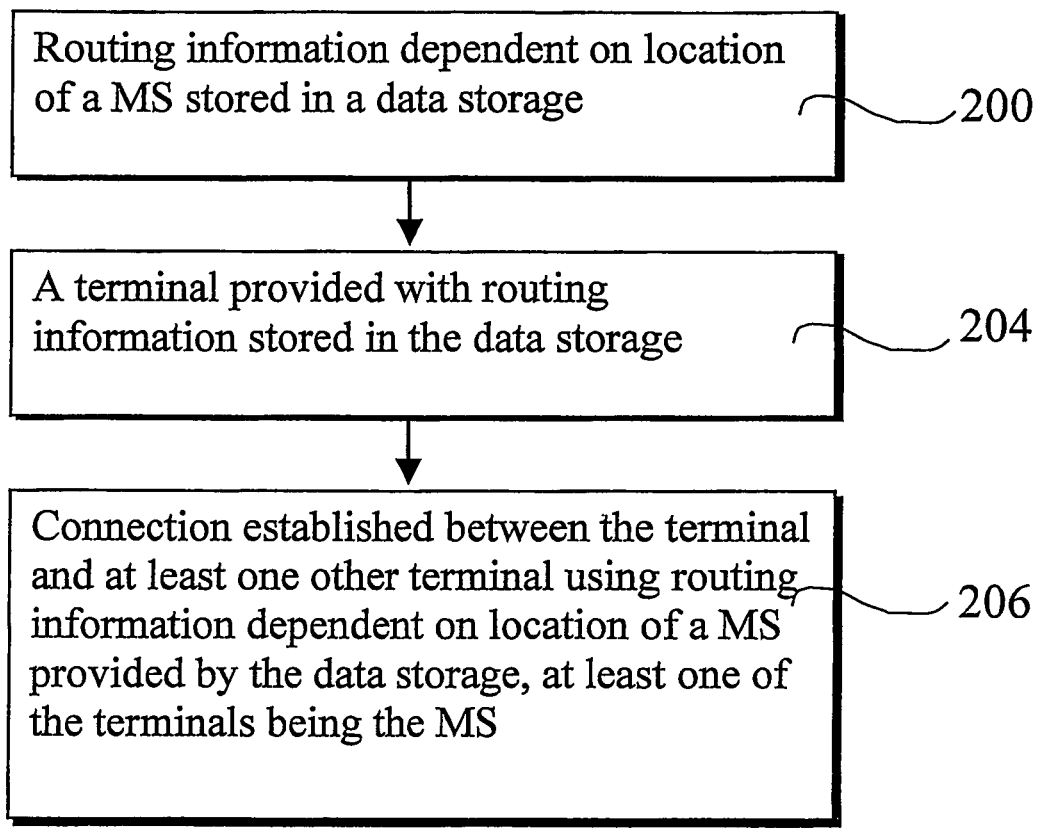
FIG. 2 is a flowchart showing steps for an embodiment of the invention.

In accordance with the embodiments, a method for providing routing information for establishing connections over a communication system comprising a plurality of communication networks is provided. The flowchart of FIG. 2 illustrates an embodiment. In step 200, location dependent routing information is stored in a data storage. In step 202, a terminal is provided with location dependent routing information stored in the data storage. In step 204, connection is established between the terminal and at least one other terminal using location dependent routing information provided by the data storage. In the embodiments, at least one of the terminals is a mobile terminal and information for routing the connection between the terminals is selected based on the location of the at least one mobile terminal.

The connection establishment can be initiated by a mobile terminal or by any other terminal connected to the communication system.

Figure 3:
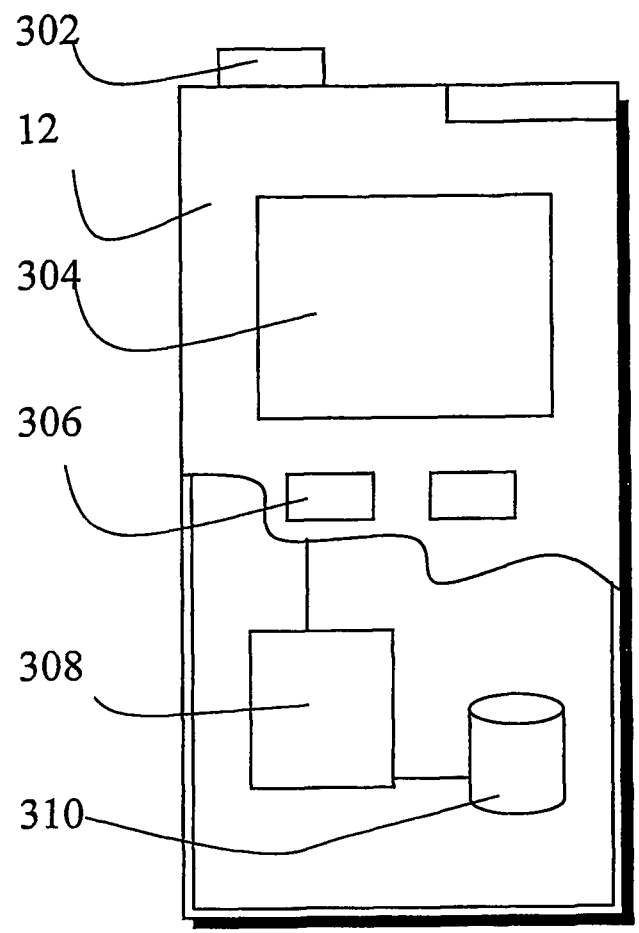
FIG. 3 shows a schematic view of a mobile terminal.

FIG. 3 shows a simplified structure of a mobile terminal 12, also called a mobile station. One skilled in the art is familiar with the features and operation of a typical mobile terminal. Thus, it is sufficient to note that the user may use a mobile terminal for tasks such as for making and receiving phone calls, for receiving and sending data from and to the network and for experiencing multimedia content or otherwise using multimedia services. A mobile terminal may include an antenna 302 for wirelessly receiving and transmitting signals from and to base stations of the mobile communication network. A mobile terminal may also be provided with a display 304 for displaying images and other graphical information for the user of the mobile terminal. Camera means may be provided for capturing still or video images. Speaker means are also typically provided. The operation of a mobile terminal may be controlled by means of an appropriate user interface such as control buttons 306, voice commands and so on. Furthermore, a mobile terminal is provided with a processing means 308 and a memory means 310.

The mobile station 12 further comprises input means for input of location dependent routing information, for example for receiving routing information from the network. Furthermore, the mobile station 12 comprises connection establishment means to be able to initiate an establishment of a connection.

Among other functions, the processing means 308 may be adapted to process information associated with the location of the mobile. The processing means 308 may comprise means for receiving an indication from the network the mobile station enters into. The processing means 308 may also comprise means determining the location from the mobile station, such as using a satellite positioning system or the like. Furthermore, the processing means may be configured to select routing information for connection establishment based on the location of the mobile terminal.

Among other functions, the memory means 310 may be adapted to store routing information and to select routing information for connection establishment.

The data storage 102 may be included in a network entity managed by the operator or another party. The data storage 102 may also be included in the mobile terminal 12. Different implementation possibilities will be described in the following description. The data storage 102 is configured to provide location dependent routing information for users of the network. In the following examples the routing information associates with calls to and from the mobile station 12. This location dependent routing information may then be used for establishing connections over the communication system comprising one or more communication networks such that the routing is based on the location of the mobile station 12. There are various ways of implementing this, and some of the possibilities will be described by way of example below.

The routing information may be associated with individuals who can be contacted via a terminal connected to the communication system. These individuals may be selected by the user of the mobile station from a set of routing information, for example as a personal dialling list of the user, see for example the list appearing in FIG. 5. The individuals may also be selected from another set of routing information, for example as a company sub-list of a group of persons working together. Naturally, any other appropriate way of grouping the individuals may be used.

According to an embodiment, the mobile terminal 12 is provided with at least two, preferably a plurality of alternative sets of routing information stored in the data storage 102 in the memory means 310 of the mobile terminal 12. The mobile terminal 12 may then itself decide which set of routing information to use based on the location thereof. For example, the mobile terminal 12 may store a plurality of alternative sets of routing information provided by a corporate directory phonebook. One set of routing information is for use when in the home network and other sets of routing information are for use when in a respective visited network.

According to another embodiment, the mobile terminal 12 may carry out a predefined action to update the routing information stored in the data storage 102 in the memory means 310 of the mobile terminal. In such an embodiment, the data storage may comprise a basic set of routing information which may converted by the mobile terminal to another set of routing information based on additional routing information received by the mobile terminal.

Another example of routing information may include local call-in numbers and other parameters for performing so called two-stage dialling. Routing information may be null for a country or operator network for which no specific routing information, such as cost-efficient alternatives, are available.

The mobile station 12 may automatically update the routing information or select appropriate set of routing information. This may be done in response to an event, such as predetermined change in location of the mobile terminal, connection set-up by the mobile terminal, an request for update, receipt of information from a subscriber information database of the home network of the mobile terminal, change in the routing information associated with an individual mobile terminal.

A specific example of the event may be detection that the operator of the network is different from the network the mobile station subscribes to. For example, whenever the terminal notifies that the current network is changed, it may check if there is specific contact database or set of routing information for the current country. If there is, that contact database or set of routing information is set as an active contact database or active set of routing information. Otherwise the international or other default contact database or set of routing information is set as the active contact database or active set of routing information.

The mobile station can be made aware of the network into which it has roamed in various ways. The mobile stations may detect the change in the operator e.g. based on the operator indicator received from the base station during the network registration process. Other possible identities are cell ID, or another identity associated with a base station of the communication system. Another possibility is that the mobile station itself determines information regarding the location thereof. Such a location information may also be provided e.g. by the so called location information services (LCS) associated with the mobile network, or by a satellite based positioning system, such as the GPS (Global Positioning System).

According to another embodiment, location information may include additional status parameters related to at least one mobile terminal. Such parameters may include presence information in the form of a dynamic profile of the user, visible to others and used to represent oneself, share information and control services. Furthermore, the parameters may include being within range of supported alternative network that uses wireless local area network (WLAN) technology, personal area networking (PAN) technology such as Bluetooth, or other parameters related to context awareness.

The embodiments may be advantageous, for example, in a distributed calling mechanism that may reduce roaming costs in case of mobile users belonging to a certain group, such as employees of a company. Such a mechanism is discussed in more detail in the following with reference to embodiments wherein a roaming mobile station may initiate a call to or receive a call from another party by means of location dependent routing information provided by the routing server 20.

Figure 4:
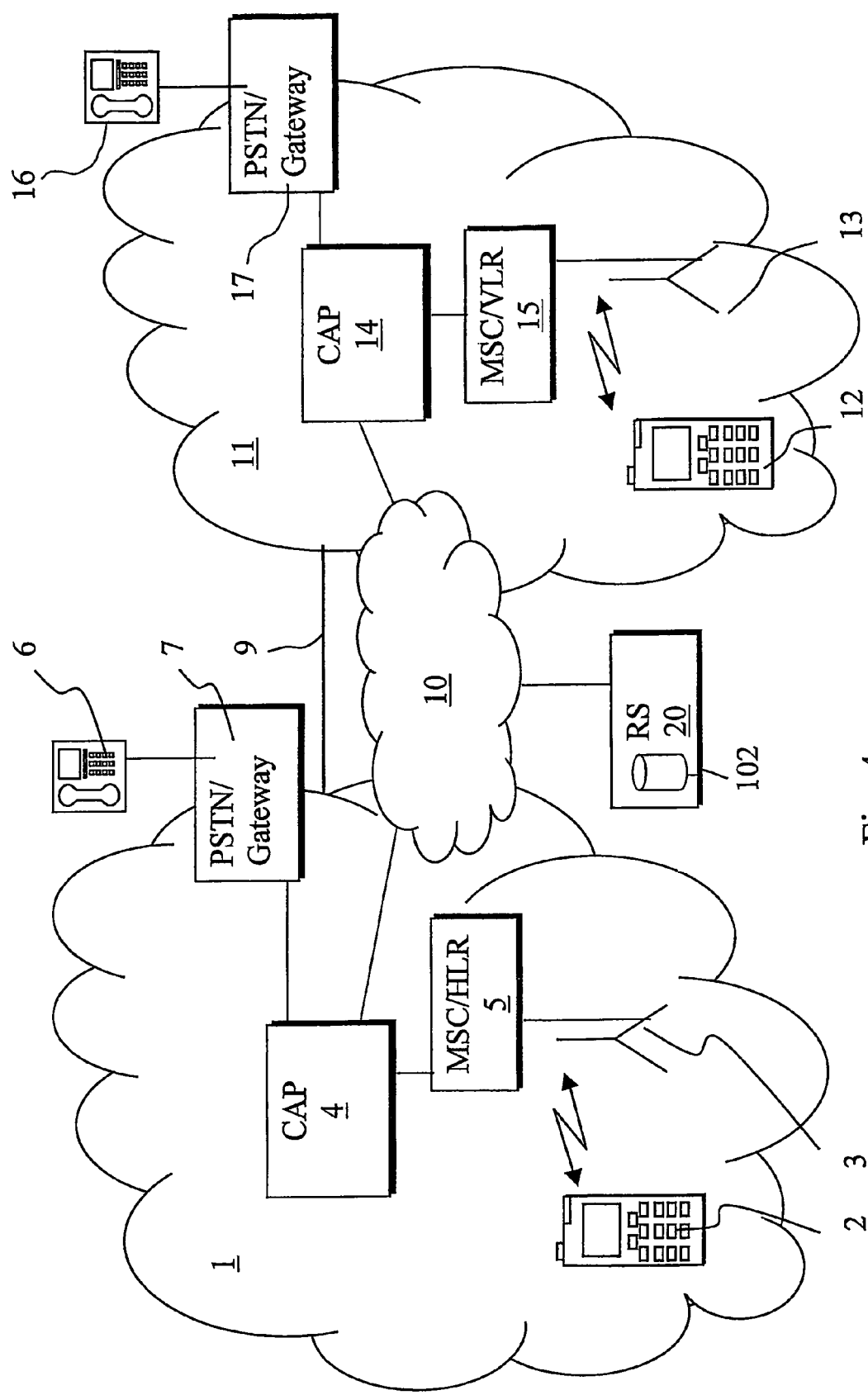
FIGS. 4 and 5 are schematic views of systems for routing a connection between a mobile station roaming in a network and a terminal in a different network, in accordance with certain embodiments of the invention.
Figure 5:
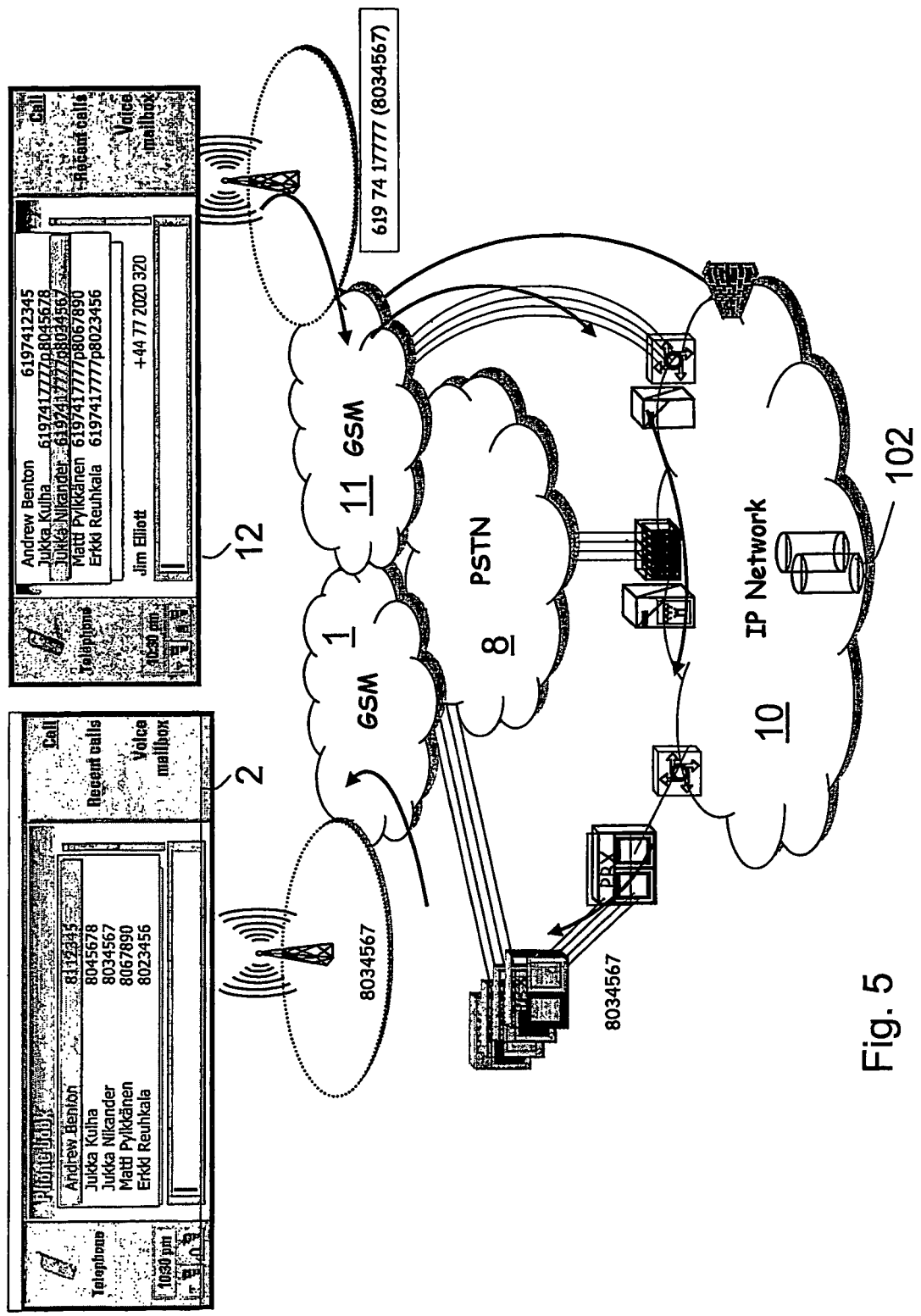

Reference now is made to FIGS. 4 and 5 showing two examples of communications systems wherein the invention may be embodied. The exemplifying communication systems are shown to comprise different communication networks 1, 8, 10, 11. User equipments or terminals connected to respective networks and enabling communication between the users thereof are also shown. More particularly, mobile terminals or stations 2, 12 and a fixed line terminals 6, 16 are shown.

In the embodiments of FIGS. 4 and 5, the mobile station 2 subscribes to the first mobile communication network 1. The mobile station 12 subscribes a network other than the network 11. Thus the first mobile communication network 1 is referenced to in the following as the home network or the home communication system for the mobile station 2. The mobile station 12 is shown to be roaming the second mobile communication network 11. The second mobile communication network 11 will thus be referenced to in the following as the visited network or the visited mobile communication network.

The terminals 2, 6, 12 and 16 may be associated with an organization whose employees may use their mobile stations in at least two networks, such as in two countries. In the following examples such organization will be referenced to by the term 'company' or 'corporate'. However, the terms company or corporate shall be understood broadly as referring to any organization or similar providing a number of users with mobile and other subscriptions. Such organizations include, without any intention to be limited to these, government bodies, international and national associations, the United Nations or various sub-organizations thereof, trade organizations and so on. Such organizations may also comprise a third party, such as a commercial service provider.

A connection can be established i.e. set-up via the third communication network 10 between the mobile station 12 connected to the network 11 and another party connected for example to the first mobile communication network 1. The networks 1 and 11 are typically connected via other means, or may even interface each other via a gateway, see FIG. 5. This connection between networks 1 and 11 is illustrated in FIG. 4 by line 9. Line 9 shall be understood to denote all possible other connections between the two networks, such as the connection that would be provided as a default connection between the roaming mobile station 12 and the home network 1.

The other party may be another mobile station, e.g. the mobile station 2. The other party may also be any other type of terminal, such as the public switched telephone network (PSTN) terminal 6. The PSTN terminal 6 may be connected to network 1 by means of the PSTN and/or suitable gateway apparatus 7 or the like.

In certain embodiments, one of the terminals is a computer. The establishment of the connection then comprises establishing a data connection between the computer and the mobile terminal.

Each of the mobile communication networks 1, 11 may comprise various network elements such as base stations 3, 13, mobile switching centers (MSC) 5, 15 and associated registers such as home location registers (HLR) and visited location registers (VLR). The same applies also for the network 100 of FIG. 1. It shall be appreciated that although not shown in Figures, a mobile telecommunication network typically comprises further network entities such as base station controllers and/or radio network controllers, support nodes, gateways and so on. The skilled person is familiar with the required elements of a mobile telecommunication network, and therefore these elements are not discussed in more detail herein. As these elements do not form an essential part of the invention they are omitted from Figures for clarity.

The third communication network 10 may be operated independently from networks 1 and 11 such that charges for connections over the third communications network 10 (if any) are not charged in accordance with the normal charging schemes of the operators of networks 1 and 11.

The third communication network 10 may employ packet switching for data communication. In FIGS. 4 and 5 the third communication network 10 is provided by an IP (Internet Protocol) based packet data communication network. The packet data communication network may be an internal data communication network of the company (e.g. an intranet of the company).

The IP based system 10 may be adapted to provide the so called Voice over IP (VoIP) backbone for the company. The skilled person is familiar with the concepts of IP based communication networks and VoIP backbones, and therefore these are not explained in any greater detail. It is sufficient to note that the IP is a packet switching protocol that is widely used for the inter organizational data communication networks. The VoIP backbone can be used for establishing voice calls between terminals connected to the IP system 10.

A routing server (RS) 20 is also shown. The routing server 20 may be connected to the communication system for example via the communication network 10 or otherwise. The routing server 20 is configured to provide location dependent routing information to the terminals in the communication system. The routing server 20 is configured to store routing information in appropriate storage means thereof, i.e. the data storage 102 for storing location dependent routing information of terminals and of individual subjects associated with the communication system. In an embodiment the routing server 20 stores various sets of routing information, for example a set for home network usage and a set for roaming usage. The routing information server 20 may store a plurality of sets of routing information, each set being associated with a certain location, such as a certain visited network.

The routing server 20 may provide information to terminals by pushing, i.e. by sending information without any request from the terminal. The routing server 20 may be configured to automatically provide the roaming mobile station 12 with appropriate routing information in response to a predefined event. For example, a message information that the mobile station is visiting network 11 may trigger the transmission.

The routing server 20 may also be adapted to transmit routing information to a terminal inquiring for the routing information. For example, routing information may be provided to a terminal which is about to start set-up of a connection over the communication system. The terminal inquiring for the routing information may be the mobile station calling to another terminal connected to the communication system. Alternatively, the terminal inquiring for the routing information may be any terminal calling to a mobile station connected to the communication system.

The routing server 20 may be able to communicate directly with terminals connected to any of the networks as well as with any entity of the communication system. The routing server 20 may also be adapted to receive location information of the terminals. According to an embodiment the mobile station 12 may inform the location thereof to the routing server 20 for example when entering in the coverage of the communication network 11.

The routing server 20 may also contain a specific set of routing information, for example a so-called corporate directory phonebook and related user information that may be communicated to the terminals, with or without a request. The server may have capabilities to automatically update contact information in the terminal, provide automatic backup for contacts entered by the user manually and to automatically recognize and resolve synonymous names in the contact information.

The routing server 20 may receive location information any time when a terminal, such as the mobile station 12, enters a network or a location area, i.e. when the location of a terminal in the communication system changes. Examples of such situations may be when the roaming situation of a mobile station is recognized or when a terminal is switched on. In such a situation, the terminal may send a message preferably automatically to the routing server. The routing server may also receive location information at regular, predetermined intervals.

It shall be appreciated that the routing server does not need to be a separated entity. Instead, the functionality thereof may be provided by any appropriate network entity, such as an access point (AP) entity 4 of FIGS. 4 and 5 as will be explained below.

In certain embodiments, the routing server functionality may be implemented in a SIP (session initiation protocol) server or a SIP proxy server. The routing server may thus become a part of the session initiation protocol.

As mentioned above, the mobile station comprises input means for input of location dependent routing information, such as routing information from the routing server 20. The input means may be comprised in the processing means 308.

As mentioned, the mobile terminal also comprises memory means 310. In the present embodiment, the memory means 310 are adapted to store routing information received from the routing server 20. When a terminal requires routing information, an appropriate set of routing information or a part thereof may be provided to the terminal. An appropriate set of routing information may also be provided to a terminal automatically when the terminal provides the routing server 20 with information about its location, for example.

The routing information may be provided for the mobile station from the routing server 20 also via another means than via any of the shown communication networks. For example, the mobile station may connect itself to the routing server 20 for download of routing information via an appropriate local connection, such as short range wireless link or cable. The routing information may also be transferred to and/or stored in the mobile station by means of the memory means 310, such as an appropriate memory card.

In accordance with an embodiment the routing information stored in the memory means 310 of the mobile station may be updated based on routing information received from the routing server 20.

In accordance with an embodiment, in a roaming situation, the mobile station 12 may receive from the routing server 20 an indication of an action to be taken consistently with all the routing information comprised in the memory means 310. As an example, this action may be adding the number of the local access point, for example the AP 14 of FIG. 4, in the beginning of each number in the dialling list stored in the memory means of the mobile station, as will be explained below. It is also possible that the mobile station receives the all or part of the desired dialling list or set of routing information from the routing server and overwrites the previous dialling list or set of routing information with the new dialling list or set of routing information. Several other possibilities may be used.

Figure 6:
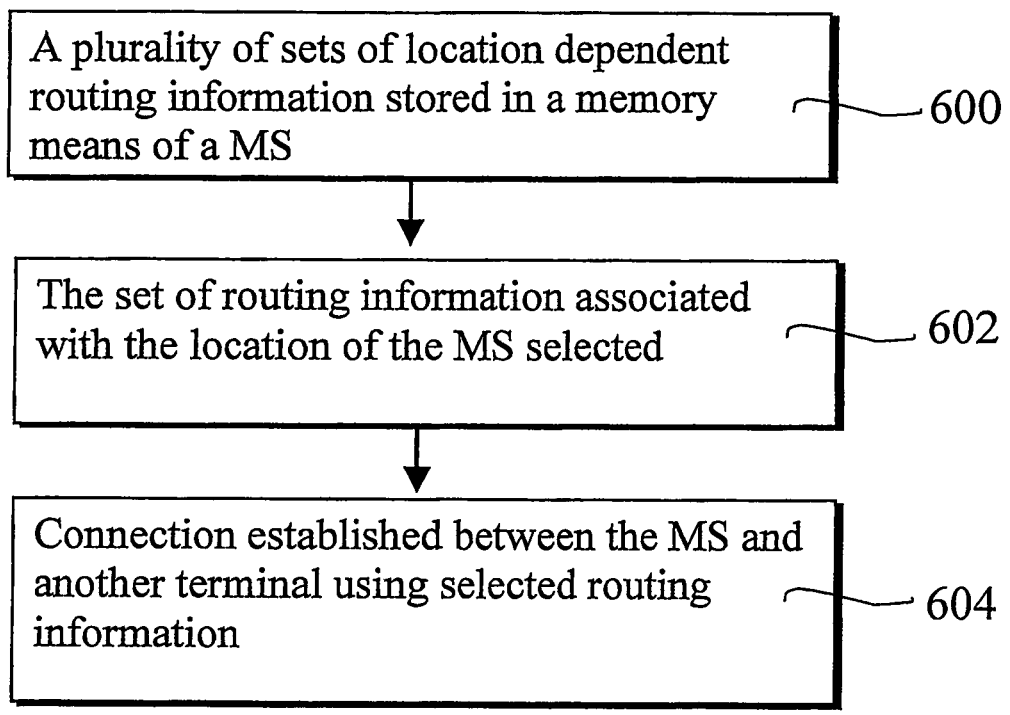
FIG. 6 is a flowchart showing steps for a further embodiment of the invention.
Figure 7:
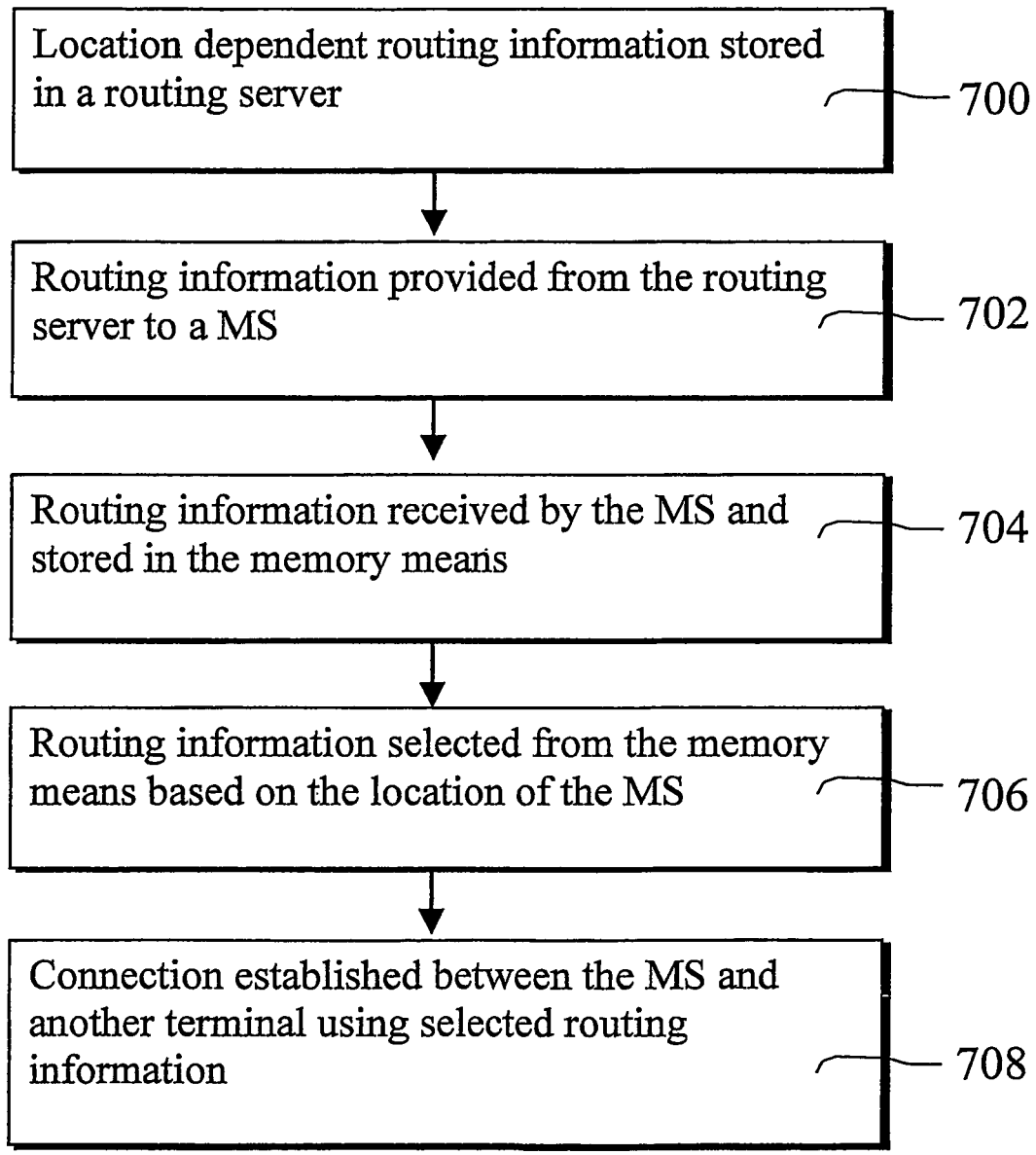
FIG. 7 is a flowchart showing steps for a further embodiment of the invention.
Figure 8:
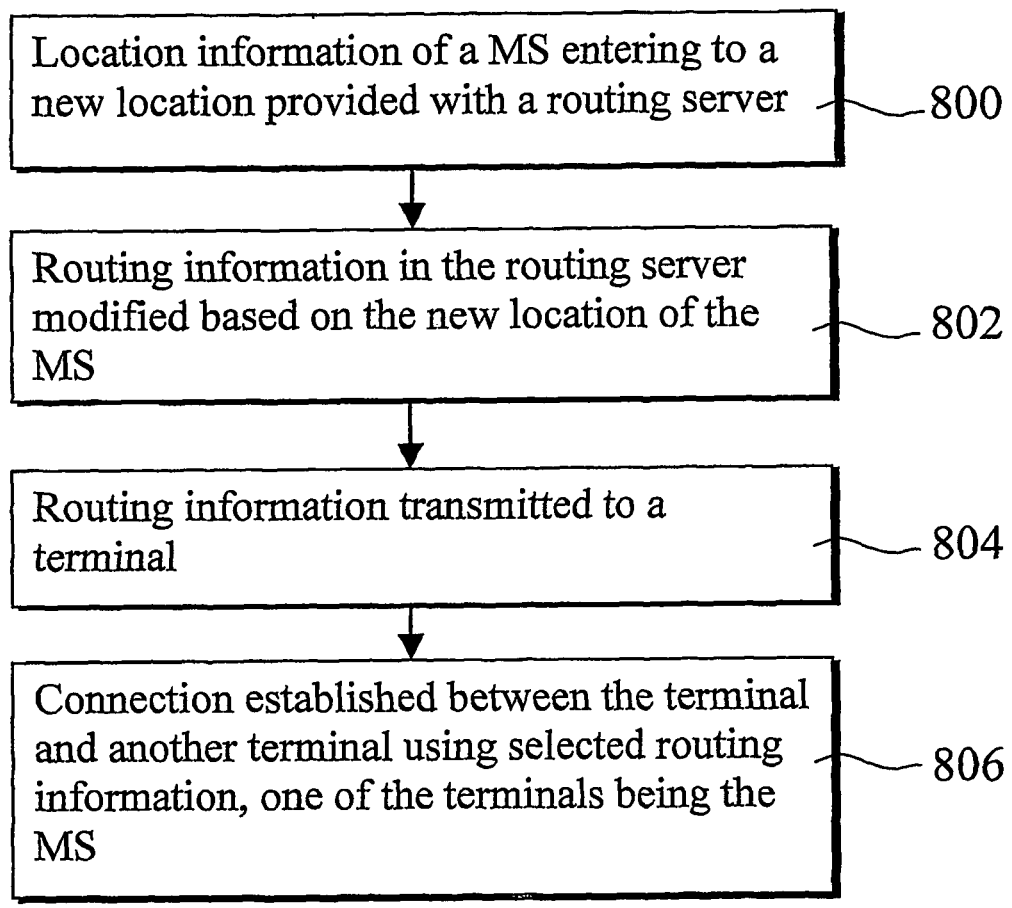
FIG. 8 is a flowchart showing steps for a further embodiment of the invention.

Certain embodiments are now described in connection with FIGS. 6-8 illustrating alternative or complementary embodiments. A system may include a plurality of the functions described herein or only one or two of them.

Reference will now be made to the flowchart of FIG. 6 illustrating operational steps in accordance with an embodiment. In step 600, a plurality of sets of routing information are stored in a memory means of the mobile terminal. When the mobile terminal enters to a network, the set of routing information associated with the network is selected from the sets of routing information at step 602. A connection may then be set-up between the mobile terminal and another terminal by means of the selected routing information at step 604.

FIG. 7 shows a further embodiment. In step 700 routing information is stored in a routing server. Routing information may then be provided from the routing server to a mobile terminal at step 702. The routing information is received by the mobile terminal and stored in memory means of the mobile terminal at step 704. When the user of the mobile terminal wants to set-up a connection with another terminal, appropriate routing information is selected from the memory means based on the location of the mobile terminal at step 706. A connection may then be set-up between the mobile terminal and another terminal by means of the selected routing information at step 708.

In accordance with a further embodiment illustrated in FIG. 8, the routing server 20 is configured to modify routing information stored in the database thereof based on location information associated with the location of a particular mobile station. The location information may be received for example from the mobile terminals, from company specific access points or from the operator of the home or visited network. In this regard a reference can be made to the flowchart of FIG. 8 illustrating this exemplifying embodiment.

In step 800, location information of a mobile station entering to a new location, such as a visited network, is provided to a routing server. Routing information stored in the routing server is modified based on the new location of the mobile station in step 802. This modification may comprise updating the routing information relating to the mobile station and/or selecting an appropriate set of routing information to be transmitted to the mobile station. Routing information is then transmitted from the routing server to a terminal in step 804. The terminal may then use the information for initiating the set-up of a connection in step 806. The initiation of the set-up may occur immediately upon receipt of the routing information, or the routing information may be stored in the terminal and used later on for the connection set-up.

In a typical use case the location of mobile stations served by the routing server needs to be known on country level. There are various mechanisms how this can be supported. Some examples are given below.

A routing information client sends automatically a short message to a service number associated with the routing server, or with another entity storing the location dependent information in the data storage, when the client recognizes a roaming mobile station. In the following, routing server is used to denote the entity storing the location dependent information in the data storage. However, it shall be appreciated that the entity may be any other appropriate network entity, certain examples of which are given in this description. The client can recognize roaming e.g. based on changed operator identity. The identity information may be included in the short message. When the routing server receives the short message, it updates the location information in the data storage based on the identity information.

The mobile station 12 comprises processing means 308 as mentioned above. The processing means may participate in a process for informing the location of the mobile station to the routing server.

Location information of an employee may also be retrieved from operator's network by making inquiry based on the MSISDN of the mobile station. The routing server may check if the location of the terminal has changed and thus update the routing information, if needed. The checking can be made from the operator of the home network of the terminal. The checking can be made at regular, predetermined intervals or whenever desired and the checking may be automatic or manual.

Another possibility is to perform an explicit location registration, for example when a roaming employee makes the first phone call through the system. The system updates the location information based on the route through which the call is routed into the corporate IP network, i.e. through which gateway the call comes in. In certain embodiments, an explicit location registration may be done when for example a roaming mobile station establishes the first connection from the visited network through the corporate communication network 10 with the aid of the routing server. The routing server may then update the location information based on the route through which the call is routed into the corporate communication network 10, such as through which gateway the call comes into the corporate communication network 10.

The routing server may also receive routing information for an individual connected to a terminal in the communication networks. These terminals may include any terminal connected to the communication system to which a user of a mobile station might wish to establish a connection. These terminals may be located in any network comprised in the communication system. For example, if the location of an individual, such as the office of the individual, changes so that the contact information also changes, the routing information in the routing server may be changed. The routing server may receive routing information directly from the individual, for example by means of a registration message. The routing server may receive routing information also from another party, such as a register administrator or the like.

Referring back to FIG. 4, in accordance with an embodiment, a company responsible for the costs for calls from and to terminals 2, 6, 12 and/or 16 may have set up at least one network-based access point (AP) entity 4, 14. The AP entities may be provided in association with the home network 1 and in at least one foreign country. In FIG. 4 the latter is provided in association with the visited network 11. The AP entities may provide the terminals 2, 6, 12 and 16 connected to the respective networks with access points so that the terminals may have connections over the third communication network 10. The AP entities 4, 14 are able to communicate via the IP system 10 of the company employing the users of mobile stations 2 and 12. It shall be appreciated that the users of mobile stations or other terminals need not be employees of the company operating the communication network 10. This definition is given for illustrative purposes only. Furthermore, the users of terminals need not subscribe the same network.

An AP entity may be provided by means of a server or similar data processing entity. The AP server may be located at any location wherein it has access to the network 10. Thus it may be located at the premises of the company itself, at the premises of the operator of the respective communication network or even at the premises of a third party service provider. In FIG. 4 embodiment the AP servers 4, 14 are provided with communication means enabling VoIP communication with each other over the IP network 10. The AP servers 4, 14 are also shown to be connected to the respective mobile networks 1, 11. The AP server 4 is also shown to be connected to the fixed PSTN network. It shall be appreciated that the AP servers 4, 14 may be connected, depending on the application, to any entity of the networks involved in provision of connections to the subscribers, such as to local MSC 5, PSTN 7, intelligent network (IN) entities (not shown) and so on. In certain embodiments, the PSTN gateway functionality may be integrated into an AP.

The AP entities 4, 14 shown in FIG. 4 are only an example of possible access points. Possible access point implementations may also comprise mobile virtual private network (VPN) media gateway or other VoIP boxes with break-in and/or break-out capabilities, calling card access number or a tailor-made access point with wide range of options. The implementation depends on various aspects. More elaborate solutions may be needed in optimizing calls received in a roaming situation or relating to voice dialling.

In some networks an automatic two-stage dialling may be needed. In two-stage dialling a number of an AP entity or of a similar element is added in the front of the telephone number of the terminal. Typically, the number of the AP is separated from the actual telephone number of the terminal by a pause "p".

In such cases, telephone numbers to be dialled are different in different networks depending on the location of the calling party compared to the called party and the home network when a connection is to be established. In order to get the advantage of the two-stage dialling irrespective of the location, different alternative number combinations need to be available or easy to formulate so that the correct number combination can be readily retrieved in every location.

The mobile station or the routing server may take care of the managing and creation of such number combinations. The mobile station or the routing server may create a network-specific set of routing information, so-called sub-list, of a larger data storage, so-called contact database. Such a sub-list may comprise the AP number plus the actual contact number stored in the contact database. For example, when a Finn goes to Germany, the routing server can provide the Finnish country-specific list with the local German AP for that particular visiting user when the user is registered with the local AP. A general set of routing information or a network-specific set of routing information may be shared by a plurality of users. The contact database may be stored in the memory means of the mobile terminal or in the routing server.

According to an embodiment, multiple databases may be avoided. Routing information may be dynamically applied to a selected contact database entry comprised in the master set of routing information during each call set-up. In such a case, the selected database entry is converted to an actual number to be dialled by the terminal using location dependent routing information stored in the data storage. Such converting may comprise, for example adding the AP number in the front of the number stored in the contact database. The AP number is thus in this case the location dependent routing information.

In certain cases, the contact information of a certain terminal is not included in the set of routing information. In such a case, the address of the other terminal, such as the telephone number, is inputted in the calling terminal. The calling terminal then performs an action, such as converting the dialled number, based on the location dependent routing information.

The embodiments enable use of name-based dialling when the mobile station is abroad, or otherwise roaming, as well as in the home network. The routing server comprising a contact database may be used to in provision of data to roaming users such that a name may always be linked with desired, updated routing information. The number linked with the name may be updated in the routing server in an appropriate manner, for example in relation to a registration process as described in the following or then a roaming mobile station may select the appropriate routing information among information sent from the roaming server.

The name-based dialling system routes the call from the roaming mobile station in accordance with a name selected from a list stored in the mobile station, spoken to the mobile station or otherwise input into the mobile station. The user of the roaming station may access the system by dialling a short access number, e.g. '444', regardless the country the roaming user is in at the moment. Having such a number for a company e.g. all over Europe in each country, a corporate traveller can call any of his/her colleagues just by giving the full name of the called party. The location and thus the routing information of the called party may then be retrieved from the contact database. Having a replica of user's personal dialling list on the routing server, the roaming user is enabled to call via the service any of the names appearing in the user's personal contact list.

Retrieval of the updated personal contact list from the routing server provides several advantages. Even though the mobile station may already have a list of contact details as well as the number for the roaming AP, the mobile station may, although their capabilities grow all the time, be capable of storing nothing more than a limited list. For a large company the list of employees and their contact information may be substantially large and, more importantly, the list may change regularly, even daily. It may thus be advantageous to be able to store this information on the network side.

In the following some examples of establishing a connection between terminals over the communication system are described with reference to FIGS. 4 and 5, where appropriate.

When the user of the mobile station 12 arrives to a visited network, for example a foreign country, the mobile station 12 may register into the local operator's network 11 in a state-of-the-art manner. The registration process may be handled by the mobile switching center and visitor location register (MSCNLR) 15. As the registration process as such is well defined by appropriate mobile telecommunication standards, it will not be discussed in here in more detail. It is sufficient to note that the registration may be required e.g. for the purposes of providing required call routing and charging information.

In addition, the mobile station 12 may be adapted to register into the local AP 14 of the company. The local AP is associated with the visited network 11, and may thus also be referenced to as visited AP.

In the following detailed description of an example, the registration process is described referring to the AP. The AP informs the routing server 20 of the location of the registered mobile station. However, the information relating to the location of the mobile station may also be provided directly with the routing server, for example such that the home network of the mobile station directly informs the routing server on reception new location information from the visited network.

In order to improve user friendliness of the system as well as to ensure that all roaming users indeed register into the routing server and/or the local AP, it is advantageous if the registration process is automatic so that it occurs seamlessly and transparently from the user.

The location information message itself may include an indication that the mobile station has entered an area where it needs to register into the local AP.

The automatic registration process may be initiated, for example, such that the terminal sends automatically a message in response to detection that registration to AP and/or routing server is required. The message may be, for example a short text message, a multimedia message, an email message or the like. When the AP receives the message, it may update the terminal location information, for example based on the operator identity included in the message. The AP may also forward the information relating to the location of the mobile station to the routing server.

Alternatively, the registration process may be made by an automatic phone call to the local AP or by any other automatic transaction appropriate for this purpose. Instead of automatic registration, the user of the mobile station 11 may simply request for registration in the AP 14 e.g. by selecting an appropriate option from the menu of the mobile station, by pressing a specific button or sending a request message (e.g. a short message service message) to the AP 14.

However, the automatic registration is preferred since the cost cutting may prove difficult to realize if the registration depends solely on the users. This might be especially the case if the users feel that they are forced to use clumsy approaches.

As mentioned above, the mobile station 12 may be provided with memory means for storing routing information associated with individual destinations in the communication networks. The mobile station 12 may be adapted to receive updated information either automatically or on a demand.

An appropriate sub-list of the contact database or another appropriate list, such as a list of APs may become available to the mobile station automatically, for example when the roaming situation is recognized in relation to the registration process. In the context of the registration process, the sub-list may be automatically selected by the mobile station based on the country or other specific location where the mobile station is roaming. The automatic selection may be initiated by the mobile station, by any appropriate entity of the network the mobile station is connected to or by an entity of the organization.

The message from the routing server, the AP or the network may include information indicating if the operator is integrated with the company, whether the operator supports a corporate dialler functionality of the company and how the corporate dialler functionality may be accessed, a call-in number and other details about the nearest AP, details for two-stage call set-up approaches, authentication or authorization keys or details for the AP, recommended IDD code to be used instead of "+" and so on. Preferably, this information is sent in parametrized format.

The contacted visited AP or other network element may authenticate the mobile station in order to assure that the mobile station is allowed to receive routing information from the routing server or other information for example from the AP. The authentication may be carried out e.g. based on the phone number of the mobile station (e.g. the Mobile Subscriber International Integrated Services Digital Network number; MSISDN) or other unique identifier depending on the application. Depending e.g. on the required security level and the used applications the identification may be based e.g. on the International mobile subscriber identifier (IMSI), subscriber identity module (SIM) number, a unique identifier of the mobile device itself (e.g. IMEI; International Mobile Equipment Identity), and so on.

In some cases, the original calling line information may disappear. This may happen for example when the call comes from a public network to a corporate private network. Furthermore, the calling party may have denied sending the information relating the calling number. When the calling number cannot be received, the identification may be carried out for example based on the dual-tone multi-frequency (DTMF) tones, through a speech recognition function responding to human voice or through a short message.

Calling party identification may be done through a caller identity inquiry procedure where the identification entity within the AP may generate a specified DTMF tone, for example '9', which is sent to the line as inbound signalling immediately after a call has been established to the AP. When the identification module in the terminal receives the tone it may send its own number information as a response to inquiry using DTMF tones. The identification entity may take the number, search the corresponding MSISDN from a register for example within the AP, and proceed with the call establishment procedure if the number was found from the register. Otherwise the call may be rejected and the identification entity may make 'Unauthorized Call Attempt' registration to the call log.

If the identification entity does not start to receive an answer to the inquiry within a period of time, for example 5 seconds (i.e. terminal of the calling party does not support the caller identity inquiry), the call establishment may proceed but the identification entity may make 'No Number' registration to the call log.

Calling party identification inquiry using DTMF tone may also be initiated by the receiver of the call, either manually or automatically through software, whenever the calling party identity is not otherwise received. In this embodiment, a call connection needs to be established for the duration of the inquiry.

Another alternative for the caller identity inquiry may be to utilize speech recognition technology. The AP may provide speech recognition capability through which the calling line identity information can be requested from the end-user. When the AP receives a call without proper calling line identification the identification entity within the corporate access point may generate the request with human voice e.g. 'Please say your name' to the line after which the user must say his/her name e.g. 'Jukka Nikande'. The identification entity may then transform the user's name e.g. as LDAP CN (Lightweight Directory Access Protocol Common Name) and proceed as described above.

Request the name of the user with human voice may in certain embodiments be the preferred way to get the needed identification information. However, it requires basic Interactive Voice Response (IVR) functionality from the system. In certain embodiments, the information may be requested using a DTMF tone. The identification entity could give a DTMF tone, any tone, after which the user may say his/her name.

The implementation of the registration function may require modifications to the software part of the mobile station. It shall be appreciated that the next generation mobile stations, such as the Symbian™ based mobile devices are coming to the market, and that these devices are adapted to enable easy implementation of simple device-based applications. Thus the required functionalities of the mobile station may also be implemented as a non-proprietary solution (e.g. as an add-on software).

After a successful authentication, i.e. the mobile station 12 is satisfactory being identified as being a corporate user or otherwise allowed user e.g. based on the Mobile Subscriber International Integrated Services Digital Network (MSISDN), IMSI, SIM, or IMEI codes thereof, the DTMF tone or using a speech recognition function, the foreign AP 14 informs the routing server 20 and/or the home AP 4 of the registration of the roaming mobile station 12. After the routing server 20 has received notification from the visited AP 14 that the mobile station 12 is roaming within the specified network, the routing server 20 may modify routing information in the routing server, advantageously in the contact database. The routing server may then provide updated information with another terminal or to transmit an appropriate dialling sub-list to the mobile station 12.

The home AP 4 may also use the updated routing information for routing any calls to the mobile station 12 via the IP system 10. In some cases, the routing server may provide routing information for example to the home location register if the call is to be routed without the aid of APs. The routing server 20 connected to the communication system has received information relating to the location of the mobile station 12 when the roaming situation was recognized and the mobile station 12 registered with the visited AP 14 and/or the visited network 11. The routing server 20 has modified the routing information in the contact database.

Some applications may require communication of other information between the routing server, the connection management entities, the terminals and/or other network entities. For example, information such as roaming mobile subscriber numbers or other temporary numbers may need to be signalled between the respective connection management entities and appropriate network entities of the home and/or visited networks (for example, the HLR of the subscriber and/or the visited location register of the roamed network). The number for voice mail service center and the number for short message service center may need to be changed.

Users can maintain the personal dialling list in the routing server via e.g. a web interface. The personal dialling list may be accessed in various ways. Some of them have been discussed above. Also voice dialling may be used, where the routing server transmits the desired routing information to the mobile station and the mobile station acts automatically. All the user needs to do is to speak the called party's name to the routing server. It is also possible that the personal contacts are stored for speaker-dependent name dialling, i.e. the user trains speech samples for the desired names on the personal contact list. However, a web-based interface for defining personal contacts in written form and then using speaker-independent name recognition is believed to be a more efficient and user-friendly approach. The network based storage of personal dialling lists may enable storage of more names than what could be stored in the mobile station itself. Also different types of lists may be stored.

The roaming users may be provided with a speech-enabled dialling mechanism that is similar to that they are used to in their home country. Furthermore, a speech-enabled dialling scheme provides ease-of-use, naturalness and enhanced safety for the user. This may be especially advantageous for users who are doing some other tasks, such as driving a car or being otherwise engaged with other tasks.

The routing server can be hosted by the company itself. Thus no telephone system operator needs to be involved. Instead, a VoIP connection over the IP system 10 can be used for the data transportation. If the routing server is implemented by the company, it is up to it how the routing server is utilised further, and no involvement of the local operators is needed. However, it is possible that routing server platforms are provided by operators or third parties who can then sell further the service.

Some of the embodiments are described above in the context of a third network. It shall be appreciated that the third network 10 is not necessary for the implementation of the invention. For example, the communication may be routed via only two networks in an optimized manner based on the location of the mobile station. The optimization may be based on various factors, such as the price, quality, capacity and reliability of the communication paths on offer.

In some of the above embodiments the third network 10 has been identified as an IP based communication system (VoIP). However, it shall be appreciated that the third communication network 10 or any further communication network can be any network capable of transferring communication between the terminals. For example, any packet switched network such as a frame relay network or asynchronous transfer mode (ATM) network or alike could be used. The communication could then be communicated e.g. as Voice over frame relay or Voice over ATM. The third network 10 can be the communication network of the company or leased from an operator or provided by a third party. The mobile telecommunications systems the user subscribe to can be any mobile system.

It shall also be appreciated that although the roaming uses a mobile station for the connection, the other party may subscribe to any type of network. The home access point to the system may be associated with any type of communication network, such as a PSTN, a local area network (LAN) and so on.

For the sake of simplicity some of the embodiments were described above in relation to a corporate case. It shall be appreciated that the invention is applicable in the context of any mobile user.

A single routing server can also serve many organizations. Updating of the routing information can be arranged so that from the corporate side, the updating is carried out by the corporate. The routing server modifies routing information based on the registration information it receives from the roaming mobile stations.

It is also noted herein that while the above describes exemplifying embodiments of the invention, there are several variations and modifications which may be made to the disclosed solution without departing from the scope of the present invention as defined in the appended claims. The embodiments described above relate mainly to call connections. However, the same concept using the data storage may be used in routing short messages, electronic mail or the like.

The invention claimed is:

1. A method comprising:
    determining, by a user terminal, that the user terminal is currently located in a visited network;
    initiating, by the user terminal, a transmission of a set-up message from the user terminal to a home network of the user terminal, a gateway between the visited network and the home network, or a combination thereof;
    receiving, at the user terminal, a plurality of local dial-in numbers of one or more visited networks including the visited network;
    determining, by the user terminal without user intervention, at least one of the local dial-in numbers for the visited network corresponding to one or more contact phone numbers stored in the user terminal as a location dependent routing number; and
    upon detecting an incoming or outgoing call request associated with the one or more contact phone numbers, receiving an incoming call or making an outgoing call, by the user terminal without user intervention, by initiating a connection to the one or more contact phone numbers via the visited network using the location dependent routing number.

2. A method of claim 1, wherein the incoming or outgoing call is further connected via an internal communication network between the visited network and a home network of the one or more contact phone numbers.

3. A method of claim 2, further comprising:
receiving, at the user terminal, one or more updates to the plurality of local dial-in numbers associated with the one or more visited networks from the home network of the user terminal, the internal communication network, or a combination thereof.

4. A method of claim 1, wherein the local dial-in number does not incur a roaming charge in the visited network for the incoming or outgoing call.

5. A method of claim 1, wherein the connection is established via performing a two-stage dialing based on the corresponding location dependent routing number transparently from a user of the user terminal.

6. A method of claim 1, wherein the user terminal is determined as located in the visited network based, at least in part, on position information received form a satellite based positioning system, a cell identifier received from a base station, an operator indicator received from a base station, or a combination thereof.

7. A method of claim 1, wherein the local dial-in number is associated with a network access point of the visited network.

8. An apparatus comprising:
at least one processor; and
at least one memory including computer program code for one or more programs,
the at least one memory and the computer program code configured to, with the at least one processor, cause the apparatus embedded in a user terminal to perform at least the following,
determine that the user terminal is currently located in a visited network;
initiate a transmission of a set-up message from the user terminal to a home network of the user terminal, a gateway between the visited network and the home network, or a combination thereof;
receive a plurality of local dial-in numbers of one or more visited networks including the visited network;
determine, without user intervention, at least one of the local dial-in numbers for the visited network corresponding to one or more contact phone numbers stored in the user terminal as a location dependent routing number; and
upon detecting an incoming or outgoing call request associated with the one or more contact phone numbers, take an incoming call or make an outgoing call, without user intervention, by initiating a connection to the one or more contact phone numbers via the visited network using the location dependent routing number.

9. An apparatus of claim 8, wherein the incoming or outgoing call is further connected via an internal communication network between the visited network and a home network of the one or more contact phone numbers.

10. An apparatus of claim 9, wherein the apparatus is further caused to:
receive, at the user terminal, one or more updates to the plurality of local dial-in numbers associated with the one or more visited networks from the home network of the user terminal, the internal communication network, or a combination thereof.

11. An apparatus of claim 8, wherein the local dial-in number does not incur a roaming charge in the visited network for the incoming or outgoing call.

12. An apparatus of claim 8, wherein the connection is established via performing a two-stage dialing based on the corresponding location dependent routing number transparently from a user of the user terminal.

13. An apparatus of claim 8, wherein the user terminal is determined as located in the visited network based, at least in part, on position information received form a satellite based positioning system, a cell identifier received from a base station, an operator indicator received from a base station, or a combination thereof.

14. An apparatus of claim 8, wherein the local dial-in number is associated with a network access point of the visited network.

15. A non-transitory computer-readable storage medium carrying one or more sequences of one or more instructions which, when executed by one or more processors, cause an apparatus embedded in a user terminal to at least perform the following steps:
determining that the user terminal is currently located in a visited network;
initiating a transmission of a set-up message from the user terminal to a home network of the user terminal, a gateway between the visited network and the home network, or a combination thereof;
receiving a plurality of local dial-in numbers of one or more visited networks including the visited network;
determining, without user intervention, at least one of the local dial-in numbers for the visited network corresponding to one or more contact phone numbers stored in the user terminal as a location dependent routing number; and
upon detecting an incoming or outgoing call request associated with the one or more contact phone numbers, receiving an incoming call or making an outgoing call, without user intervention, by initiating a connection to the one or more contact phone numbers via the visited network using the location dependent routing number.

* * * * *